United States Patent
Ollivrin

(10) Patent No.: US 11,774,611 B2
(45) Date of Patent: Oct. 3, 2023

(54) DECENTRALIZED MANAGEMENT OF SEISMIC SOURCE SHOOTING

(71) Applicant: SERCEL, Carquefou (FR)

(72) Inventor: Gilles Ollivrin, Nantes (FR)

(73) Assignee: SERCEL, Carquefou (FR)

( * ) Notice: Subject to any disclaimer, the term of this patent is extended or adjusted under 35 U.S.C. 154(b) by 490 days.

(21) Appl. No.: 17/109,481

(22) Filed: Dec. 2, 2020

(65) Prior Publication Data

US 2022/0171080 A1 Jun. 2, 2022

(51) Int. Cl.
*G01V 1/00* (2006.01)
*G05D 1/00* (2006.01)
*G05D 1/02* (2020.01)

(52) U.S. Cl.
CPC ............ *G01V 1/005* (2013.01); *G05D 1/0022* (2013.01); *G05D 1/0291* (2013.01)

(58) Field of Classification Search
CPC ..... G01V 1/005; G05D 1/0022; G05D 1/0291
See application file for complete search history.

(56) References Cited

U.S. PATENT DOCUMENTS

| | | |
|---|---|---|
| 6,603,707 B1 | 8/2003 | Meunier et al. |
| 9,213,118 B2 | 12/2015 | Winter |
| 2008/0205191 A1* | 8/2008 | Coste .................. G01V 1/42 367/25 |
| 2012/0008462 A1 | 1/2012 | Liu et al. |
| 2012/0290213 A1 | 11/2012 | Huo et al. |
| 2013/0163381 A1 | 6/2013 | Sallas |
| 2013/0208563 A1 | 8/2013 | Phillips et al. |

OTHER PUBLICATIONS

International Search Report dated Feb. 7, 2022 in related/corresponding PCT Application No. PCT/IB2021/000729.

* cited by examiner

*Primary Examiner* — Krystine E Breier
(74) *Attorney, Agent, or Firm* — PATENT PORTFOLIO BUILDERS PLLC

(57) ABSTRACT

A method for seismic exploration of a subsurface formation with a seismic survey system includes directly receiving a message, at a first fleet of seismic sources, from a second fleet; storing the message at the first fleet; verifying one or more constraints related to the first and second fleets, at the first fleet; initiating a triggering sequence of the seismic sources of the first fleet, upon verification of the one or more constraints, with no input from a central unit of the seismic survey system; and performing a sweep based on the triggering sequence.

20 Claims, 8 Drawing Sheets

DECENTRALIZED MANAGEMENT OF SEISMIC SOURCE SHOOTING

BACKGROUND

Technical Field

Embodiments of the subject matter disclosed herein generally relate to methods for seismic data acquisition using fleets of seismic vibrators, and more specifically, to a seismic data acquisition system that allows the fleets of seismic vibrators to start vibrating based on a decision made locally, at a local controller of each fleet, instead of being made globally, by a central unit.

Discussion of the Background

In the oil and gas industry sector particularly, seismic surveys are commonly used to search for and evaluate subterranean hydrocarbon deposits. Seismic surveys are exploration methods that gather and record data related to seismic wave reflections from interfaces between geological layers. Seismic data is then used to create detailed models/images of the underlying geological structures.

FIG. 1 schematically depicts a land seismic survey system 100 for seismic exploration in a land environment. System 100 includes plural sources 110 (only a single vibratory source on a truck is shown for simplicity) that generates seismic waves, receivers 120 (e.g., geophones) for detecting the seismic reflections, and a central unit 130 that coordinates the acquisition process and instructs each source when to vibrate. Central unit 130 is also configured to record electrical signals or seismic data resulting from sampling electrical signals generated by the receivers 120 upon detecting seismic reflections. To perform the seismic survey, the sources 110, receivers 120 and the central unit 130 are positioned on ground surface 150. However, the sources 110 and the central unit 130, being carried on trucks, may be repositioned, while receivers 120 are usually fixedly arranged over the surveyed geological structure along receiver lines.

In operation, the plural sources 110 generate seismic waves that may include a surface waves 140 and body waves 160 that may be partially reflected at an interface 170, between two geological layers inside which the seismic waves propagate with different speeds. Each receiver 120 receives the full wavefield (i.e., both surface and body waves) and converts it into an electrical signal.

Source 110 may be a vibratory source. Vibratory sources are actuated in sweeps lasting generally between 2 and 60 seconds, during which time the vibratory sources generate seismic waves whose frequencies vary over a given range (e.g., 2-200 Hz). Receivers 120 record data fora period during and after the sweep time has ended. This period after the sweep time is known as the listening time. During the listening time, one or more sources 110 may be moved from one location to a next location according to a predetermined survey plan. The locations where seismic sources are activated are known as vibration points.

FIG. 2 illustrates a conventional land survey plan. Seismic receivers 210 (only a few are labeled) are arranged along receiver lines 220, 224, 226. Individual seismic receivers may be deployed along the receiver lines at substantially equal intervals, for example, of about 25 m. Distance between adjacent receiver lines (e.g., 220 to 224, or 224 to 226) may be, for example, about 200 m. The receiver arrangement illustrated in FIG. 2 may be achieved when the surveyed area allows such a layout. However, in practice, the lines may not be parallel straight lines.

Trucks carrying seismic sources 230-241 move along shot lines SL, stopping at successive vibration points. FIG. 2 illustrates a grid of vibration points at intersections of shot lines SL (parallel to receiver lines 220, 224, 226) and lines SN perpendicular to the shot lines SL. A distance between adjacent shot lines may be about 25 m, and a distance between lines SN may be about 50 m. The trucks may use Global Positioning System (GPS) equipment to position the seismic sources at the vibration points according to the survey plan. After a source is instructed by the central unit to generate seismic waves according to a predetermined sweep at a vibration point, the truck moves to a next vibration point.

A shooting plan includes a large number of vibration points to acquire the information necessary to arrive at conclusions related to the presence and location of subterranean hydrocarbon deposits. Even if the combined sweep and listening time for each one of the vibration points is less than 30 s, acquiring seismic data for all vibration points in a typical survey plan takes a long time as all the sources need to send data regarding their location and status to the central unit, the central unit needs to check that given constraints required by the owner of the survey are followed, and the central unit needs to instruct each source, individually, about a time when to start the vibration. This is expensive in terms of equipment and personnel and also delays the entire process, as the central unit is sometimes backed up due to the multiple calculations performed for each source and/or due to the transmission delays.

Meanwhile, there is a permanent desire to increase vibration points' density to achieve better images of the explored underground structures. Therefore, increasing productivity is an ongoing effort.

One method of increasing the productivity of acquiring seismic data known as "slip-sweep" is to start a next sweep before the end of listening time related to a previous sweep. The time interval between successive sweeps is known as the slip time. However, to be able to separate seismic data corresponding to the different sweeps, the slip time is limited by the requirement to avoid overlapping harmonic energy generated during successive sweeps. To separate seismic data corresponding to seismic vibrations produced simultaneously by different sources, there are processing methods that can be used. In this case, it appears the productivity gained by starting a next sweep before a previous sweep ends is offset by repeating the sweep multiple times.

Another technique of increasing the seismic data acquisition productivity known as "independent simultaneous sweeping" (ISS) is described in U.S. Patent Application Publication No. 2012/0290213, the content of which is incorporated herein by reference. ISS uses statistical methods to remove interference due to unsynchronized overlapping sweeps of sources located at large distances therebetween (e.g., 12 km).

There is a need for a new method for controlling the plural sources that is faster and more efficient than the existing processes.

SUMMARY

To increase data acquisition productivity, a decision process about when a source can vibrate is moved from the central management unit to a controller that is located at the source, i.e., locally. The local controller is configured to interact with its peer sources and decide locally when to start the vibration, without involving the central unit. Thus, the bottleneck communication between the central unit and each source is removed and the delays between the central unit and the plural sources are at least partially eliminated.

According to one embodiment, there is a method for seismic exploration of a subsurface formation with a seismic survey system. The method includes directly receiving a message, at a first fleet of seismic sources, from a second fleet; storing the message at the first fleet; verifying one or more constraints related to the first and second fleets, at the first fleet; initiating a triggering sequence of the seismic sources of the first fleet, upon verification of the one or more constraints, with no input from a central unit of the seismic survey system; and performing a sweep based on the triggering sequence.

According to another embodiment, there is an electronic part that controls a sweep of a first fleet of seismic sources. The electronic part includes a local controller that is part of the first fleet of seismic sources. The local controller is configured to directly receive a message from a second fleet. The electronic part also includes a memory configured to store the message. The local controller is further configured to, verify one or more constraints related to the first and second fleets, initiate a triggering sequence of the seismic sources of the first fleet, upon verification of the one or more constraints, with no input from a central unit of a seismic survey system that includes the first and second fleets, and determine the seismic sources of the first fleet to perform the sweep based on the triggering sequence.

According to yet another embodiment, there is a non-transitory computer readable medium including computer executable instructions, wherein the instructions, when executed by a computer, implement the method discussed above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed using terminology of a land data acquisition system that uses vibratory sources. However, similar methods may also be pertinent to marine seismic data acquisition and to data acquisition and processing based on similar approaches, such as measuring electromagnetic or ultrasound responses of an unknown structure to excitations injected into the structure at different locations.

Reference throughout the specification to "one embodiment" or "an embodiment" means that a particular feature, structure or characteristic described in connection with an embodiment is included in at least one embodiment of the subject matter disclosed. Thus, the appearance of phrases "in one embodiment" or "in an embodiment" in various places throughout the specification is not necessarily referring to the same embodiment. Further, the particular features, structures or characteristics may be combined in any suitable manner in one or more embodiments.

To increase productivity, vibratory sources are usually grouped in clusters of two or more that emit simultaneously (i.e., during substantially the same sweep time). Such a cluster is also called a fleet. The vibratory sources in a fleet start sweeping at the same time except when instructed by the master of the fleet. Each fleet includes a master source/truck and one or more slave sources/trucks. The master is configured to check one or more conditions relative to the other fleets in the seismic survey, and then to decide locally when to start vibrating, without specific instructions from a central unit. The central unit, i.e., the global command system, still monitors the quality of the shooting achieved by the various fleets, but does not directly instructs a fleet when to start vibrating/sweeping.

Figure 1:
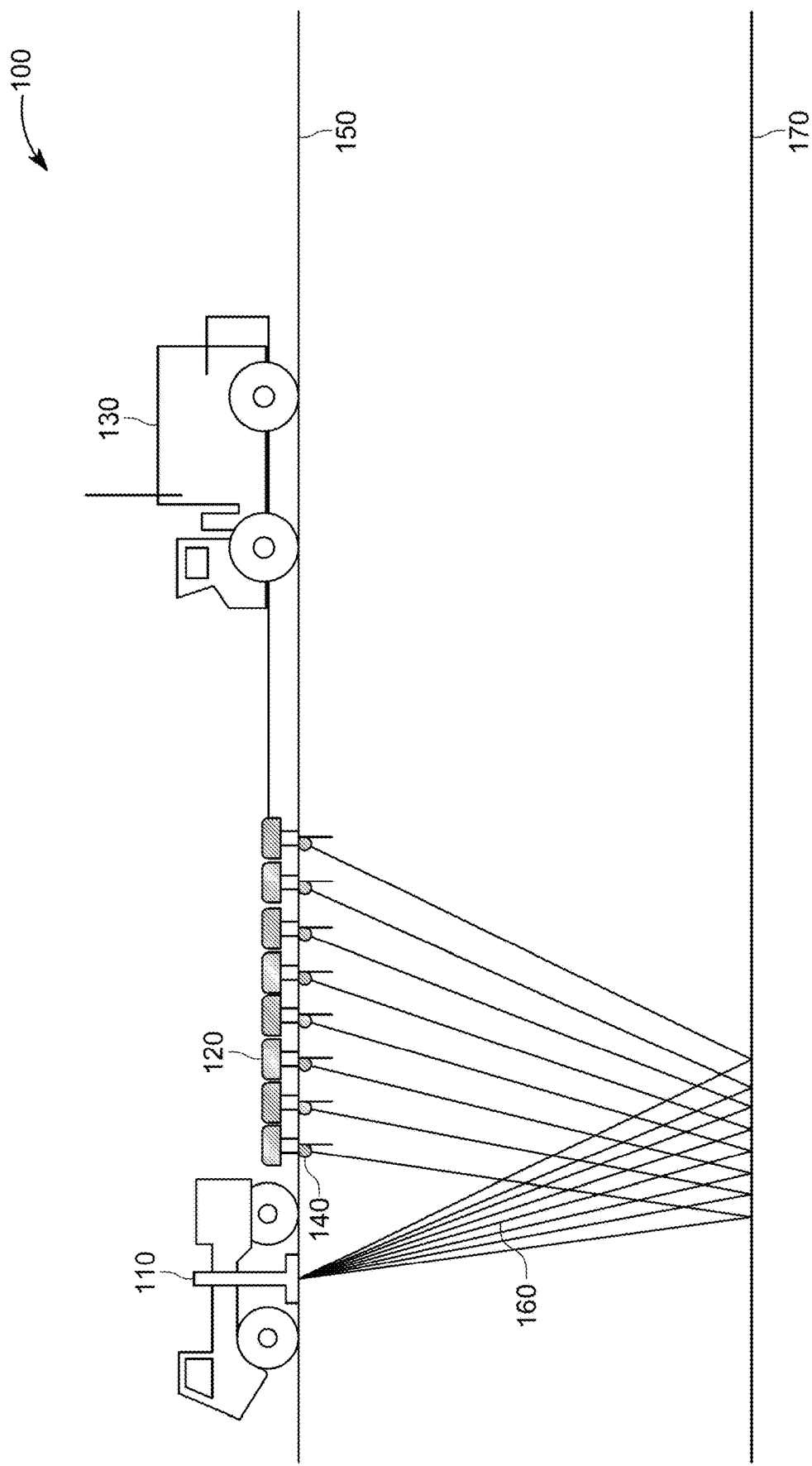
FIG. 1 is a schematic diagram of a land seismic survey system.
Figure 2:
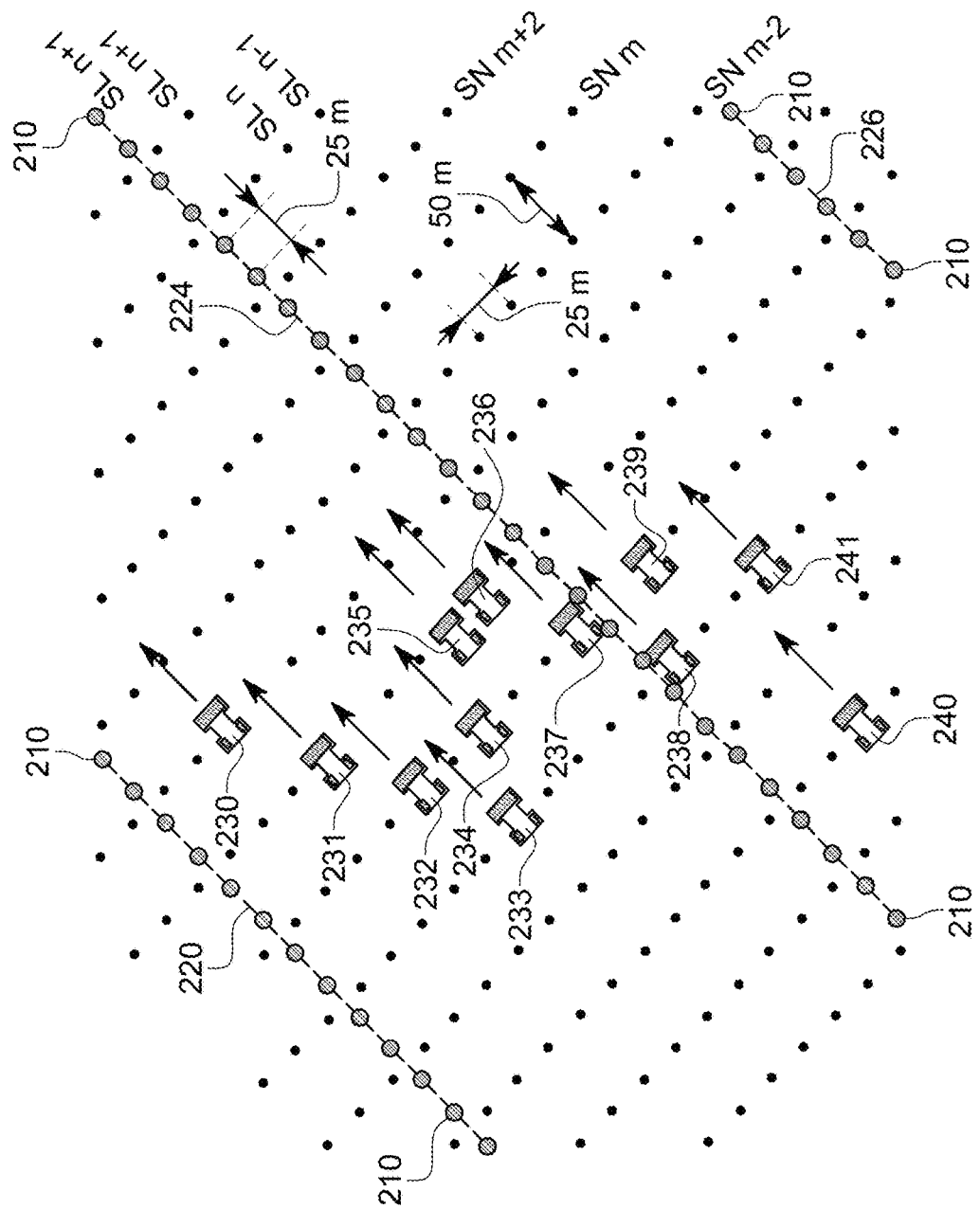
FIG. 2 illustrates a conventional land survey plan.
Figure 3:
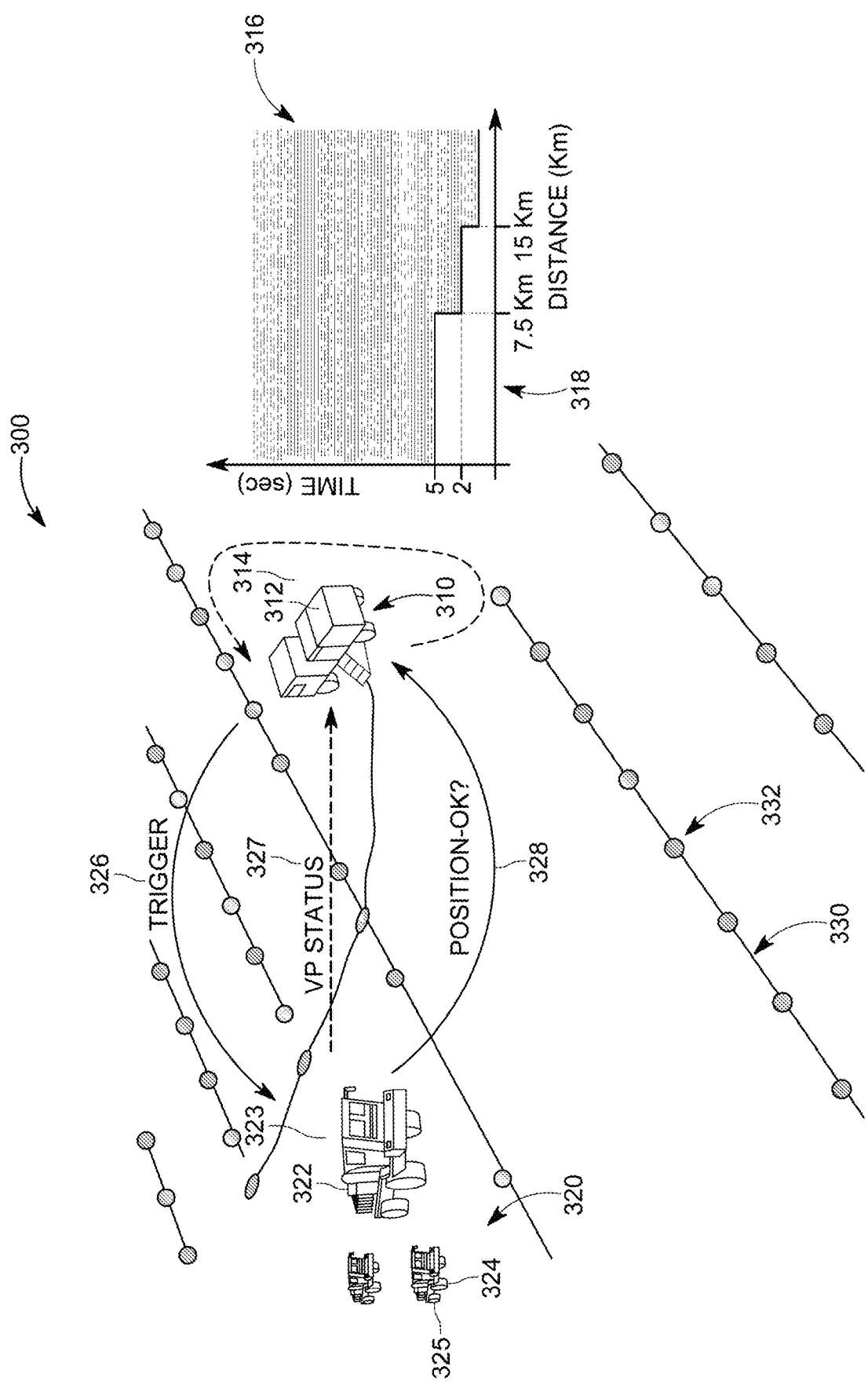
FIG. 3 illustrates the communication that takes place between a central unit and various fleets of seismic sources for a given seismic data acquisition system.

To better understand the new method and local controller proposed by the inventors for reducing the acquisition time by making local decisions about shooting, an acquisition system 300 in which the central unit controls all the sources and their vibration starting time is now discussed with regard to FIG. 3. The system 300 includes one central unit 310 and plural fleets 320 (only one is shown for simplicity). The fleet 320 includes a master source 322 and one or more slave sources 324, each located on a corresponding truck 323 or 325. Each source, master or slave, is a vibratory source carried by a corresponding truck in this embodiment. Those skilled in the art would recognize that other type of sources may be used, not only vibratory sources, and that a fleet may be reduced to only a master truck. The master source 322, which is shown in more detail in FIG. 4, includes an actuator part 402 and an electronic part 404. The actuator part 402 may include one or more mechanical parts (e.g., base plate, vibration mechanism, etc.), one or more pneumatic parts (e.g., pump, hoses, liquid tank, etc.), and/or one or more electrical parts (e.g., force sensor, pressure sensor, valves, etc.). The actuator part 402 physically contacts the ground and imparts the acoustic waves into the ground. The electronic part 404 may include a local controller (e.g., processor, computer, laptop, server, etc.) 406 and a storage part 408, e.g., a memory. The local controller 406 is configured to communicate, through a transceiver 410, with the central unit 310 and receive commands 326 indicative of the vibration starting time. The local controller 406 is configured to collect the local position 328 of the source and the source status 327, and transmit this data to the central unit 310. The source status may include a starting time of the sweep, force related information associated with the force exerted by the source on the base plate, etc. The electronic part 404 is linked with an electronic link 412 to the actuator part 402, for actuating the pump and implicitly the base plate.

The central unit 310 has its own controller 312 and transmitter 314 for communicating with each fleet 320. The controller 312, which is a global controller as it controls the local controllers of the sources of each fleet, processes the data received from each fleet and determines whether each fleet is in position, ready to shoot, and if any constraints imposed by the owner of the data acquisition system are validated. The global controller 312 may calculate a delay for a given source if that source does not fulfill all the required constraints. For example, as shown in FIG. 3, the global controller 312 can generate a plot 316 of time differences between two sweeps and the distance between the two sweeps and plot all these pairs of time and distance between the various sweeps to check if the one or more constraints are validated. An example of the one or more constraints for land vibrators may be found in U.S. Pat. Nos. 6,603,707 and 9,213,118, the contents of which are incorporated herein by reference. However, any other know constraints for a land vibrator may be used by the global controller. If there is a zone 318 in the plot 316 for which the one or more constraints are not validated, then the global controller 312 may instruct the one or more sources that cover that area to redo the sweep. Alternatively, the global controller 312 can take the decision to discard that data and move forward with the data acquisition process. It is noted that the plot 316 is made after the seismic data has been collected at a certain vibration point. FIG. 3 also shows lines 330 including plural seismic sensor 332, that collect the seismic data generated by the sources 320. The lines 330 can be physical lines if the sensors are wired, or imaginary lines if the sensors are wireless. The seismic acquisition system 300 can include a mixture of wired and wireless sensors.

However, as discussed in the Background section, all these communications between the local controllers 406 and the global controller 312 add time delays, which increases with the number of sources that are operated during the seismic survey. According to an embodiment of the invention illustrated in FIG. 5, these time delays are reduced, if not eliminated, by moving part of the decision making process from the global controller 312 to each local controller 406.

Figure 4:
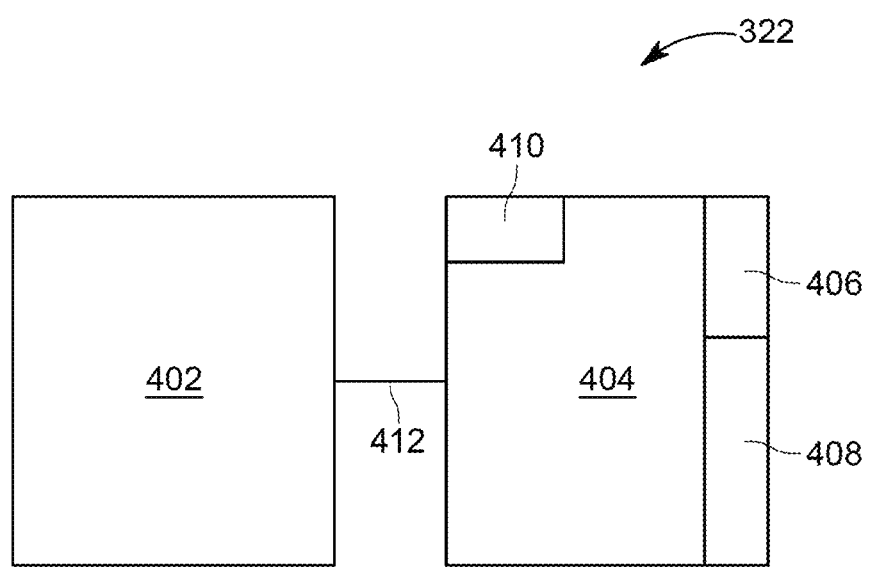
FIG. 4 illustrates a configuration of a seismic source.
Figure 5:
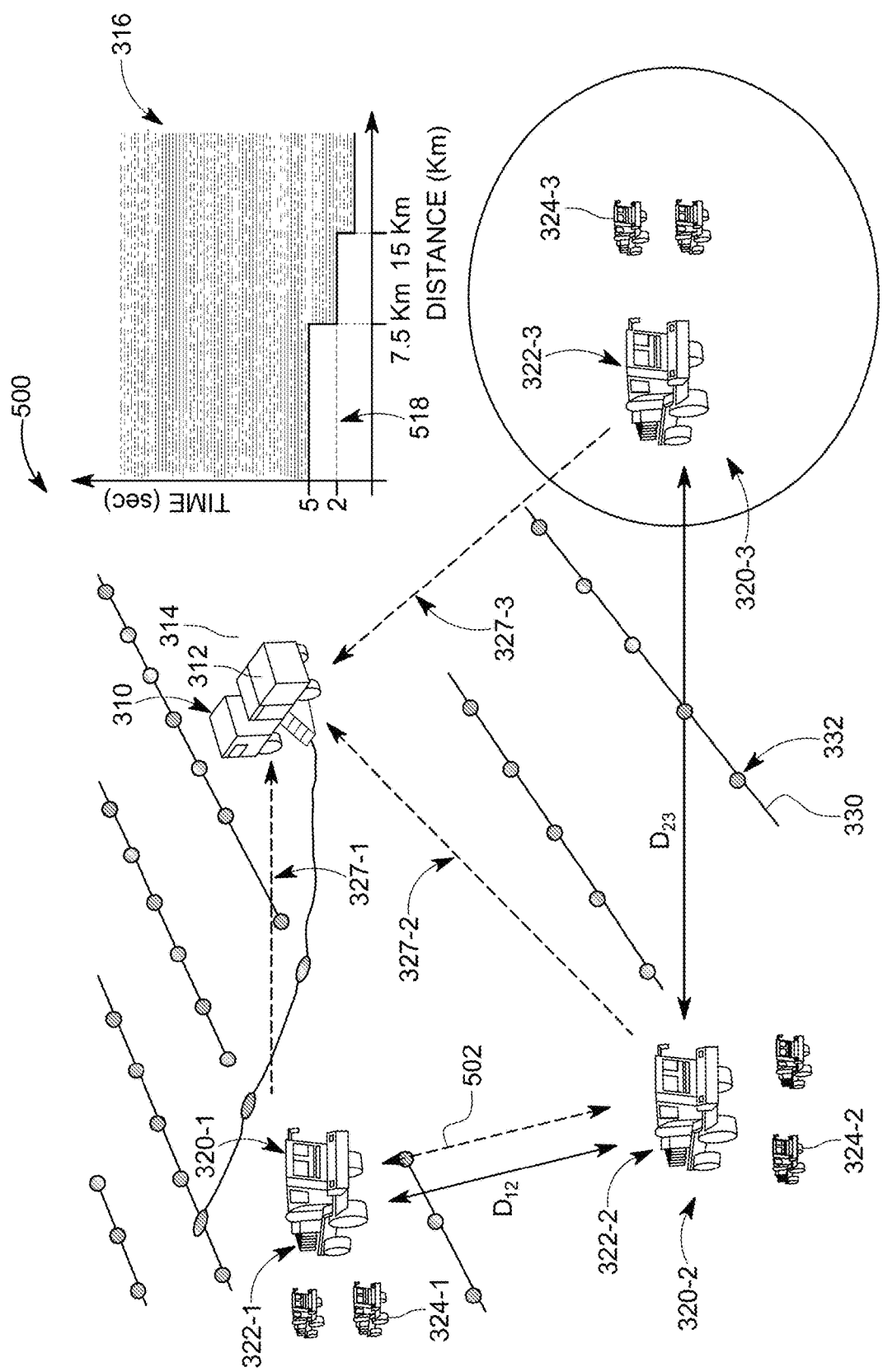
FIG. 5 illustrates a novel communication scheme that takes place between a central unit and various fleets and among the various fleets of seismic sources for a given seismic data acquisition system.

More specifically, as shown in FIG. 5, the novel seismic data acquisition system 500 includes the central unit 310 and the plural fleets 320-1 to 320-3 (only three fleets are shown for simplicity, but more or less fleets can be used). Fleet 320-1 includes a master source 322-1 and one or more slave sources 324-1. The same is true for the other fleets. Note that the fleets do not have to have the same configuration, i.e., one fleet can include more or less slave sources than another fleet; one or more fleets may also be reduced to one vibratory truck, with no slave source. The physical configuration of a master source is as shown in FIG. 4, i.e., and it includes, at a minimum a controller 406, a memory 408, and a transceiver 410. The slave source may also include the elements shown in FIG. 4, and other elements as necessary for each survey, for example, a global positioning system for receiving the actual position and the actual time, etc.

The local controller 406 of each master source 320-I, where I is 1 to 3 in FIG. 5, is configured to use the transceiver 410 to directly communicate with other local controllers of master sources from different fleets, as illustrated by message 502 in FIG. 5. Message 502 is an inter master source message or inter fleets message containing all information necessary to meet the constraint, and may include the fleet number of the local controller that is transmitting the message, the position of the local controller, which is received from the GPS system, the next vibration point, the last starting time of the last sweep, etc. In one embodiment, the information associated with the inter-fleet message 502 is automatically generated by the local controller 406 and automatically transmitted by the local transceiver 410 so that any other fleet in the system 500 can receive this information while the data acquisition is taking place.

A distance D12 between the master sources 322-1 and 322-2 of the fleets is asserted to be smaller than a communication range of the transmitter 410. This means, for example, that if the transmitter is a radio-frequency transmitter that is typically used for seismic data acquisition, its maximum range is about 5 km. However, one skilled in the art would understand that any technology can be used for the transmitter, for example, satellite communication, cellular communication, etc., in which case the communication range is much larger. If a distance D23 between the master sources 322-2 and 322-3 of two other fleets is larger than the communication range of the transmitter, then it is assumed, for the embodiment shown in FIG. 5, that the fleet 320-3 is far enough from the other fleets, and this specific fleet can vibrate independent of the fleets 320-1 and 320-2. In other words, if the distance between one or more given fleets is larger than the communication range with other fleets, the system is configured to consider that all these fleets function in an island configuration, i.e., all the fleets in an island operate independent of the fleets in another islands. This also means that the constraints that are imposed for the master sources need to be validated for each island, and not between islands.

For the system shown in FIG. 5, each master source 322-1 still sends its source status 327-I to the global controller 312 of the central unit 310 and the central unit 310 still checks the time and distance coordination of the various sweeps as illustrated in FIG. 3 by element 316, but now the global controller is configured to accept a small error in these times and distances, as illustrated by field 518.

However, different from the configuration shown in FIG. 3, the master sources in the embodiment of FIG. 5 exchange among themselves the position and the vibration timing, which may be transmitted as part of the message 502. Therefore, each master source 320-1 will store in its memory 408, to be accessed by the local controller 406, software instructions for verifying the one or more constraints between the fleets, discussed above with regard to FIG. 3, based on the data extracted from the messages 502, from the other master sources. In other words, the decision making process for determining when to start the sweeping of a given fleet is made locally, at the local controller 406 of the master source of that fleet, based on information received from its peers local controllers from the other master sources. No data exchange is taken place between the local controller 406 and the global controller 312 prior to each shot, which reduces the communication time between the active vibrators and the central unit.

In other words, the global controller 312 in the system 500 does not verify the one or more constraints and does not instruct the master source when to start shooting, as in the system 300. Regarding the master and slave sources, it is noted that the master source controls the starting time of the slave sources as the master source tells each slave source in its fleet when to start shooting. In one embodiment, the master source and the slave sources start simultaneously to shoot for a given fleet. However, one skilled in the art would understand that some delays between the sources of a given fleet may appear or may intentionally be introduced for various reasons.

The status 327-I of each master source can be transmitted to the central unit 310 with delays. In one application, the status is sent by the master source at the end of the sweep. However, if the bandwidth is small, or the master source is located in a zone where the data transmission is limited (for example, affected by local regulations), then the transmission of the status can be further delayed. In still another application, the transmission of this status can be achieved through a file that is physically carried from the master source to the central unit.

Figure 6:
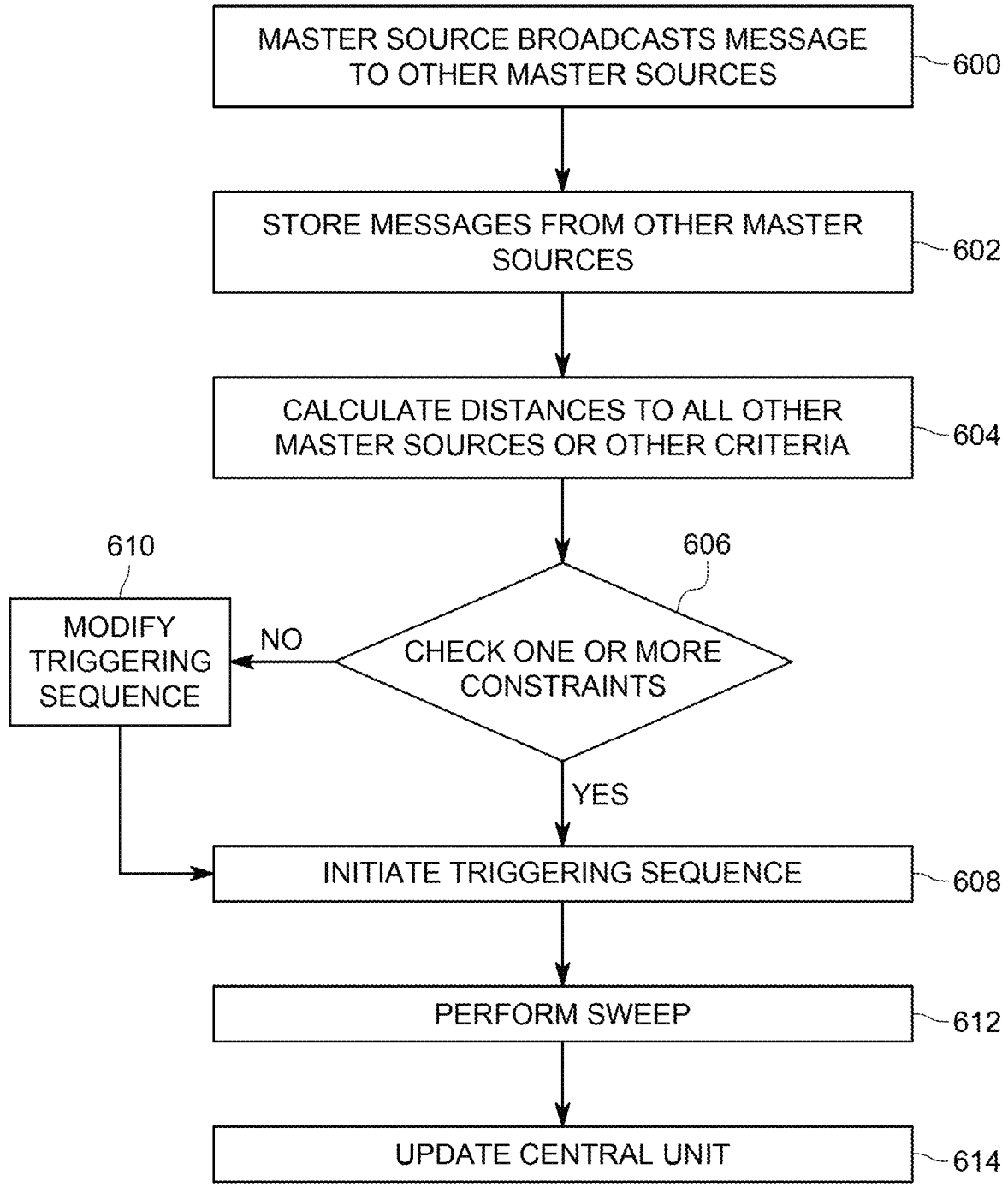
FIG. 6 is a flowchart of a method for implementing a decentralized source initiation sequence for a seismic data acquisition system that includes a central unit and plural fleets of sources.

A method for shooting the various fleets of the system 500 is now discussed with regard to FIG. 6. In step 600, each master source 320-I generates and broadcasts a message 502 that includes at least its position and the starting time of the last sweep. This information may be augmented with additional information, as required by the owner of the survey. Thus, any given master source receives this information from all the other master sources and stores this information in its memory 408 in step 602. Each master source may also calculate in step 604 the distance between the reporting master source of another fleet and its own location, to calculate the distance between two fleets. The distance between the two fleets may be calculated as the distance between the two master sources of the two sources. In one application, a location of a fleet may be implemented as a center of mass of all the sources making up a fleet. In this situation, the distance between the two fleets is the distance between the centers of mass of the two fleets. Other measures for determining the location of a fleet may be used.

In step 606, the local controller 406 of a given master source 320-I checks the one or more constraints imposed by the owner of the seismic survey, using (1) the distance between the corresponding fleet and one or more of other fleets, and also (2) the starting time of the last sweep of the one or more of other fleets. The one or more constraints may be related to a distance between the sources, a time delay between the various sweeps, both of these features, or any other known rule. Those skilled in the art would also understand that various regimens may be implemented, where each regimen includes the one or more rules. Also, it is possible that one master source implements one regimen while another master source implements another regimen, which is different from the other regimen. In one application, the regimen implemented by a master source may be changed during the seismic survey.

If the output of the step 606 is positive, i.e., the one or more constraints are validated against all the other fleets, then the triggering sequence at the given master source 320-I is initiated in step 608 by the local controller 406 of the corresponding master source, and not by the global controller 312 of the central unit 310. It is noted that no communication or data exchange has occurred between the given master source and the central unit for initiating the triggering sequence. However, if the output of step 606 is negative, the method advances to step 610, where the local controller 406 calculates, without no input from the central unit 310, when the one or more constraints will be met, by modifying the starting time for triggering the sweep. In step 612, the fleet associated with the local controller 406 that performs the steps 606 and 608 is actuated, i.e., the sweep is initiated for all the sources of the fleet. In step 614, after the shooting has been performed, the local controller 406 instructs the transmitter 410 to transmit the shooting status of the fleet to the central unit 310, so that the global controller 312 can update the plot 316 for determining the size of the error 518. Note that this step can take place at any time (with any delay) after the shooting has been completing. Further, the size of the error is survey dependent and it can be determined by the operator of the survey.

For this method, a fleet is considered to include one master source and one or more slave sources. In one embodiment, all the sources in a fleet are triggered with the same sweep or shooting sequence. It is possible that the sweep or shooting sequence is changed in time, for the same fleet, as the seismic data acquisition survey advances. It is also possible that the sweep or shooting sequence differs from fleet to fleet. The master source may be the only source that exchanges information with the central unit, for example, to transmit the source status. The master source can send the status of each slave source to the central unit. The master source is the only source that instructs the slave sources when to start the sweep. While a fleet may have one master source and n slave sources, where n is any positive integer, the number n of the slave sources in a given fleet can be changed during the seismic survey to n+m, where m is an integer.

The method discussed above with regard to FIG. 6 can be adapted to have an optional step of selecting which one or more constraints to be validated in step 606. This optional step can be performed automatically by the local controller 406, in which case, the local controller selects the one or more constraints to be validated from a library of constraints that is stored in the memory 408. The selection process may be based on feedback from the global controller 312, about the error 518. If the error 518 is found to be larger than a given threshold, the local controller 406 may impose stricter constraints to reduce the error. Alternatively, the selection may be performed by the global controller 312, based on the same error 518, and the global controller than instructs the local controller 406 to implement the new constraints. In still another embodiment, the operator of the master source may make this decision and manually input into the local controller 406 and/or memory 408 the new constraints. All these steps can be performed at the beginning of the survey, during the survey or both before and during the survey.

All these functionalities, including each of the steps of the method illustrated in FIG. 6 may be implemented in the local controller 406 and the memory 408. The local controller and the memory are shown in FIG. 4 as being part of the master source 322. However, the local controller and the memory may also be part of the electronics of the source, or associated with the truck carrying the master source, but not being effectively part of the master source. For example, in one application, the local controller and the memory are part of a mobile device (e.g., laptop, tablet, etc.) that is caried by the driver of the truck and can be placed in communication with the master source for exchanging data and/or commands.

It is also noted that the existing algorithms/software that traditionally reside in the global controller 312 and/or the central unit 310 cannot be simply copied into the local controller 406 and the memory 408 to achieve the functional features discussed above as the existing algorithms/software are too complex, large, and configured to handle many other parameters of the seismic data acquisition, e.g., sensor line distribution, etc. that have nothing to do with the source control. Thus, the software that is stored in the local memory and run by the local controller have to be specifically designed for handling only the functionalities discussed herein, and specifically the capabilities discussed above with regard to FIG. 6.

Figure 7:
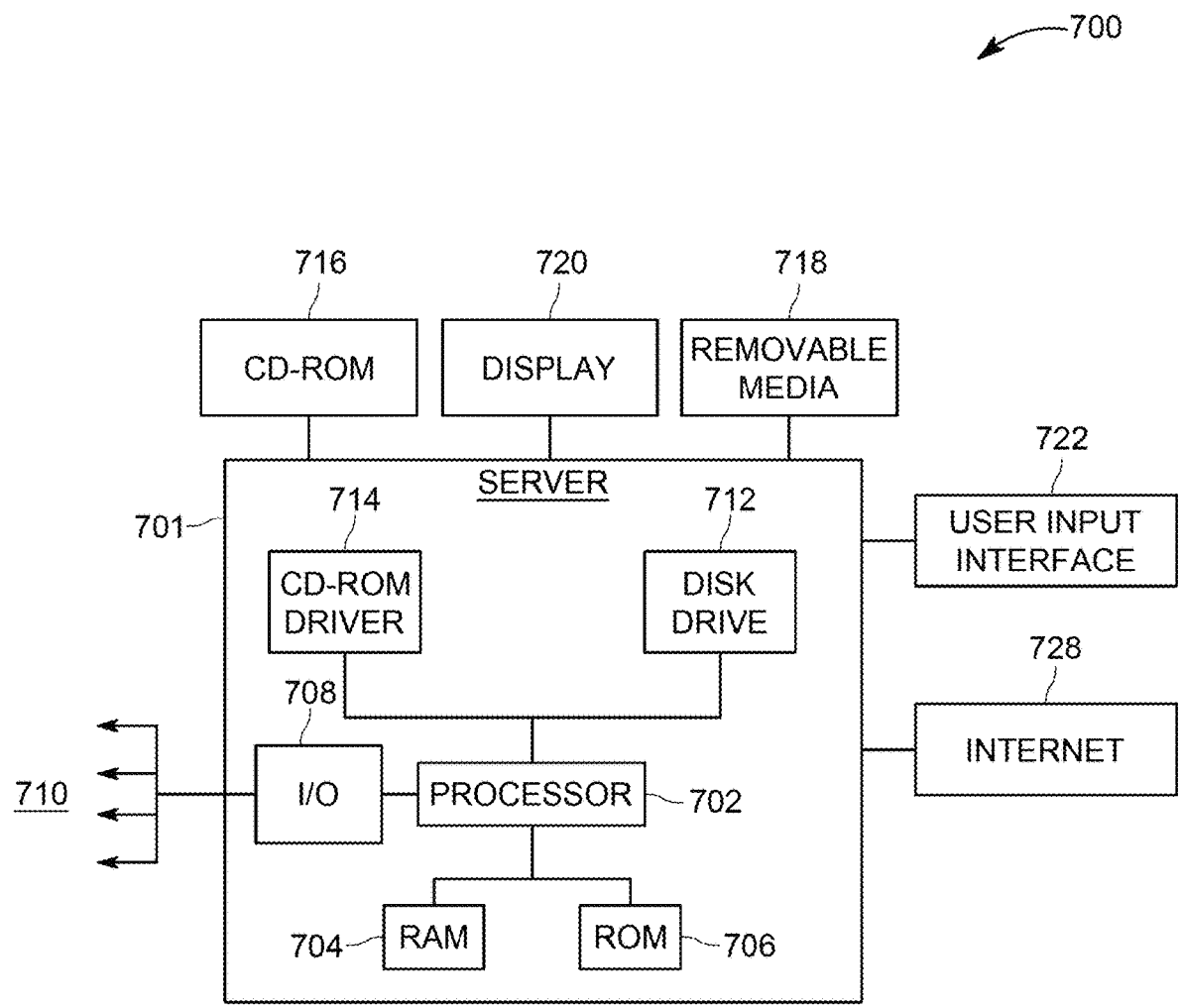
FIG. 7 is a block diagram of a controller according to one embodiment.

Returning now at FIG. 4, the electronic part 404, which includes the local controller 406, is configured to determine when to initiate the sweeping. The electronic part and/or the local controller may be implemented as a combination of software and hardware as illustrated in FIG. 7. Hardware, firmware, software or a combination thereof may be used to perform the various steps and operations. Controller 700, which is carried by a truck or it is included into a portable computing device, may include server 701 having a central processor unit (CPU) 702 coupled to a random access memory (RAM) 704 and to a read-only memory (ROM) 706. The ROM 706 may also be other types of storage media to store programs, such as programmable ROM (PROM), erasable PROM (EPROM), etc. Methods for verifying the validity of the one or more constraints and actuating vibratory sources according to various embodiments described in this section may be implemented as computer programs (i.e., executable codes) non-transitorily stored on RAM 704 or ROM 706.

Processor 702 may communicate with other internal and external components through input/output (I/O) circuitry 708 and bussing 710, to provide control signals and the like. For example, processor 702 may communicate with the sensors, electro-magnetic actuator system and/or the pressure mechanism of each source element. Processor 702 carries out a variety of functions as are known in the art, as dictated by software and/or firmware instructions. Server 701 may also include one or more data storage devices, including disk drives 712, CD-ROM drives 714, and other hardware capable of reading and/or storing information, such as a DVD, etc. In one embodiment, software for carrying out the above-discussed steps may be stored and distributed on a CD-ROM 716, removable media 718 or other form of media capable of storing information. The storage media may be inserted into, and read by, devices such as the CD-ROM drive 714, disk drive 712, etc. Server 701 may be coupled to a display 720, which may be any type of known display or presentation screen, such as LCD, plasma displays, cathode ray tubes (CRT), etc. Server 701 may control display 720 to exhibit images based on the acquired seismic data. A user input interface 722 is provided and may include one or more user interface mechanisms such as a mouse, keyboard, microphone, touch pad, touch screen, voice-recognition system, etc.

Server 701 may be coupled to other computing devices, via a network. The server may be part of a larger network configuration as in a global area network (GAN) such as the Internet 728, which allows ultimate connection to the sources, receivers, data storage unit, etc.

Figure 8:
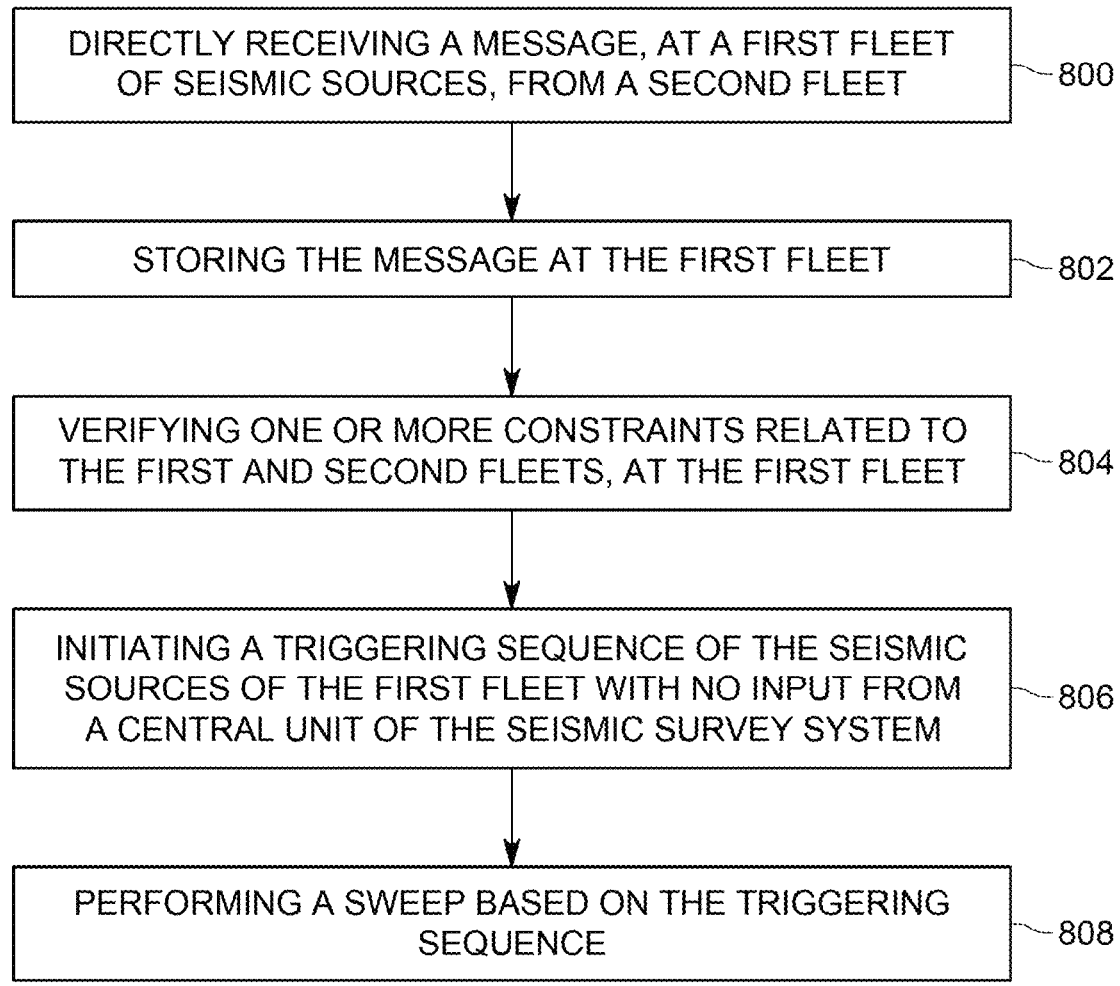
FIG. 8 is a flow chart of a method for initiating a sweep at a fleet of a seismic data acquisition system without involvement from a central unit.

The above noted structure of the electronic part 404 may be used to implement any of the methods discussed above, or the following method. A method for seismic exploration of a subsurface formation with a seismic survey system 500 is shown in FIG. 8 and includes a step 800 of directly receiving a message 502, at a first fleet 320-1 of seismic sources 322-1, 324-1, from a second fleet 320-2, a step 802 of storing the message 502 at the first fleet 320-1, a step 804 of verifying one or more constraints related to the first and second fleets 320-1, 320-2, at the first fleet 320-1, a step 806 of initiating a triggering sequence of the seismic sources 322-1, 324-1 of the first fleet 320-1 with no input from a central unit 310 of the seismic survey system 500, and a step 808 of performing a sweep based on the triggering sequence.

In one application, the seismic sources include a master source and plural slave sources, and the master source controls the slave sources. The steps of verifying and initiating are performed in the master source in one application. The steps of verifying and initiating are performed in a local controller of the master source in another application. The master source further includes a transceiver for receiving the message. The message includes only a position of the second fleet and a starting time of a last sweep of the second fleet.

The method may further include a step of directly receiving corresponding messages, at the first fleet, from other fleets of the system, and a step of storing the corresponding messages into a memory of a master source of the first fleet. The steps of verifying and initiating are performed in the master source of the first fleet, for each of the second and the other fleets in the system. The step of initiating may further include starting the sweep of each source of the first fleet without delay if a result of the step of verifying is favorable, and starting the sweep of each source of the first fleet with a calculated delay if a result of the step of verifying is unfavorable. The method may also include a step of sending a source status of the first fleet from the first fleet to the central unit after the sweeping has been performed.

The disclosed embodiments provide methods of seismic data acquisition according to which master sources of each fleet of the data acquisition system locally determine when to actuate the sources in each fleet, with no prior instructions from the global controller or central unit of the central unit of the seismic survey system. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of exemplary embodiments, numerous specific details are set forth in order to provide a comprehensive understanding of the claimed invention. However, one skilled in the art would understand that various embodiments may be practiced without such specific details.

Although the features and elements of the present embodiments are described in particular combinations, each feature or element may be usable alone without the other features and elements of the embodiments or in other various combinations with or without other features and elements disclosed herein.

The written description uses examples of the subject matter disclosed to enable any person skilled in the art to practice the same, including making and using the described devices or systems and performing any of the described methods. The patentable scope of the subject matter is defined by the claims, and may include other examples that occur to those skilled in the art. Such examples are intended to be within the scope of the claims.

What is claimed is:

1. A method for seismic exploration of a subsurface formation with a seismic survey system, the method comprising:
   directly receiving a message, at a first fleet of seismic sources, from a second fleet;
   storing the message at the first fleet;
   verifying one or more constraints related to the first and second fleets, at the first fleet;
   initiating a triggering sequence of the seismic sources of the first fleet, upon verification of the one or more constraints, with no input from a central unit of the seismic survey system; and
   performing a sweep based on the triggering sequence.

2. The method of claim 1, wherein the first fleet of seismic sources includes a master source and plural slave sources, and wherein the master source controls the slave sources.

3. The method of claim 2, wherein the steps of verifying and initiating are performed in the master source.

4. The method of claim 3, wherein the steps of verifying and initiating are performed exclusively in a local controller of the master source.

5. The method of claim 4, wherein master source further includes a transceiver for receiving the message.

6. The method of claim 1, wherein the message includes only a position of the second fleet and a starting time of a last sweep of the second fleet.

7. The method of claim 1, further comprising:
directly receiving corresponding messages, at the first fleet, from other fleets of the system; and
storing the corresponding messages into a memory of a master source of the first fleet.

8. The method of claim 7, wherein the steps of verifying and initiating are performed in the master source of the first fleet, for each of the second and the other fleets in the system.

9. The method of claim 1, wherein the step of initiating comprises:
starting the sweep of each source of the first fleet without delay if a result of the step of verifying is favorable; and
starting the sweep of each source of the first fleet with a calculated delay if a result of the step of verifying is unfavorable,
wherein the delay is locally calculated at the first fleet.

10. The method of claim 1, further comprising:
sending a source status of the first fleet from the first fleet to the central unit after the sweeping has been performed.

11. An electronic part that controls a sweep of a first fleet of seismic sources, the electronic part comprising:
a local controller that is part of the first fleet of seismic sources, and the local controller is configured to directly receive a message from a second fleet; and
a memory configured to store the message,
wherein the local controller is further configured to,
verify one or more constraints related to the first and second fleets,
initiate a triggering sequence of the seismic sources of the first fleet, upon verification of the one or more constraints, with no input from a central unit of a seismic survey system that includes the first and second fleets; and
determine the seismic sources of the first fleet to perform the sweep based on the triggering sequence.

12. The electronic part of claim 11, wherein the processor is configured to be part of a master source of the first fleet, and the first fleet also includes plural slave sources.

13. The electronic part of claim 11, wherein the message includes only a position of a second fleet and a starting time of a last sweep of the second fleet.

14. The electronic part of claim 11, wherein the local controller is further configured to:
directly receive corresponding messages from other fleets; and
store in the memory the corresponding messages,
wherein the verifying and initiating are performed by the local controller of the first fleet for each of the second and the other fleets.

15. The electronic part of claim 11, wherein the local controller is further configured to:
start the sweep of each source of the first fleet without delay if a result of the step of verifying is favorable; and
start the sweep of each source of the first fleet with a calculated delay if a result of the step of verifying is unfavorable,
wherein the calculated delay is determined in the controller.

16. A non-transitory computer readable medium including computer executable instructions, wherein the instructions, when executed by a computer, implement a method for emitting seismic waves, the medium comprising instructions for:
directly receiving a message, at a first fleet of seismic sources, from a second fleet;
storing the message at the first fleet;
verifying one or more constraints related to the first and second fleets, at the first fleet;
initiating a triggering sequence of the seismic sources of the first fleet, upon verification of the one or more constraints, with no input from a central unit of the seismic survey system; and
performing a sweep based on the triggering sequence.

17. The medium of claim 16, wherein the steps of verifying and initiating are performed in a master source of the first fleet.

18. The medium of claim 16, wherein the message includes only a position of the second fleet and a starting time of a last sweep of the second fleet.

19. The medium of claim 16, further comprising instructions for:
directly receiving corresponding messages, at the first fleet, from other fleets of the system; and
storing the corresponding messages into a memory of a master source of the first fleet.

20. The medium of claim 16, wherein the instructions further comprise:
starting the sweep of each source of the first fleet without delay if a result of the step of verifying is favorable;
starting the sweep of each source of the first fleet with a calculated delay if a result of the step of verifying is unfavorable; and
sending a source status of the first fleet from the first fleet to the central unit after the sweeping has been performed.

* * * * *